US010273687B1

(12) United States Patent
Walker et al.

(10) Patent No.: US 10,273,687 B1
(45) Date of Patent: Apr. 30, 2019

(54) PANEL POWER CONNECTOR (71) Applicant: HUFCOR, Inc., Janesville, WI (US)

(72) Inventors: Jonathon J. Walker, South Beloit, IL (US); Kurt E. Rebarchek, Janesville, WI (US)

(73) Assignee: Hufcor, Inc., Janesville, WI (US)

( * ) Notice: Subject to any disclaimer, the term of this patent is extended or adjusted under 35 U.S.C. 154(b) by 0 days.

(21) Appl. No.: 15/912,993

(22) Filed: Mar. 6, 2018

(51) Int. Cl.
    *E04B 1/344*    (2006.01)
    *E04B 2/74*     (2006.01)
    *H01R 13/24*    (2006.01)
    *H01R 25/00*    (2006.01)
    *H02G 3/38*     (2006.01)
    *H01R 25/16*    (2006.01)

(52) U.S. Cl.
    CPC .......... *E04B 2/7425* (2013.01); *E04B 1/3445* (2013.01); *E04B 2/7427* (2013.01); *E04B 2/7429* (2013.01); *H01R 13/2421* (2013.01); *H01R 25/006* (2013.01); *H01R 25/162* (2013.01); *H02G 3/386* (2013.01); *H02G 3/388* (2013.01); *E04B 2002/7488* (2013.01)

(58) Field of Classification Search
    CPC .... E04B 2/7425; E04B 2/7427; E04B 1/3445; E04B 2/7429; E04B 2002/7488; H02G 3/388; H02G 3/386; H02G 3/288; H01R 25/162
See application file for complete search history.

(56) References Cited

U.S. PATENT DOCUMENTS

| 4,214,799 | A | * | 7/1980 | Biche | H01R 35/04 |
| | | | | | 174/505 |
| 4,382,648 | A | * | 5/1983 | Propst | E04B 2/7425 |
| | | | | | 439/209 |
| 5,035,636 | A | * | 7/1991 | Hollingsworth | H01R 13/642 |
| | | | | | 439/13 |
| 5,044,971 | A | * | 9/1991 | Hollingsworth | H01R 31/02 |
| | | | | | 439/215 |
| 5,096,433 | A | * | 3/1992 | Boundy | H02G 3/288 |
| | | | | | 439/215 |
| 5,214,889 | A | * | 6/1993 | Nienhuis | E04B 2/7425 |
| | | | | | 403/254 |
| 5,277,609 | A | * | 1/1994 | Ondrejka | A47B 21/06 |
| | | | | | 439/211 |
| 9,455,561 | B2 | * | 9/2016 | Welch | H01R 25/162 |

(Continued)

*Primary Examiner* — Adriana Figueroa
*Assistant Examiner* — Jessie T Fonseca
(74) *Attorney, Agent, or Firm* — Michael Best & Friedrich LLP (57) ABSTRACT

A moveable wall is connected to a structure and is operable to receive power from a power source. The moveable wall includes a first panel is connected to the structure for movement with respect to the structure. The first panel has a first electrical connection and the first panel receives power from the power source and to direct said power to the first electrical connection. A second panel is connected to the structure for movement with respect to the structure. The second panel has a second electrical connection, and the second electrical connection is configured to electrically connect to the first electrical connection to receive said power from the first electrical connection. One of the first electrical connection and the second electrical connection has a degree of freedom to move relative to the respective panel.

20 Claims, 5 Drawing Sheets

(56) References Cited

U.S. PATENT DOCUMENTS

| | | | |
|---|---|---|---|
| 2005/0130476 A1* | 6/2005 | Kochanski | H01R 25/16 439/215 |
| 2010/0190369 A1* | 7/2010 | Byrne | H01R 4/185 439/215 |

\* cited by examiner

PANEL POWER CONNECTOR

BACKGROUND

The present invention relates to moveable wall panels.

SUMMARY

In one embodiment, the invention provides a moveable wall is connected to a structure and is operable to receive power from a power source. The moveable wall includes a first panel is connected to the structure for movement with respect to the structure. The first panel has a first electrical connection and the first panel receives power from the power source and to direct said power to the first electrical connection. A second panel is connected to the structure for movement with respect to the structure. The second panel has a second electrical connection, and the second electrical connection is configured to electrically connect to the first electrical connection to receive said power from the first electrical connection. One of the first electrical connection and the second electrical connection has a degree of freedom to move relative to the respective panel.

In another embodiment the invention provides an operable wall for use in a building having a building power or communications supply. The operable wall includes a first panel which is movable between a deployed condition and a stowed condition. The first panel includes an electrical or communications conduit having first and second opposite ends, in which the first end of the conduit is in operable communication with the building supply. A second panel is movable between a deployed condition and a stowed condition. The second panel includes an electrical or communications conduit having first and second opposite ends. A connector includes a first part operably communicating with the second end of the conduit of the first panel and a second part operably communicating with the first end of the conduit of the second panel. The second part has a degree of freedom of movement with respect to the second panel. The first and second parts of the connector engage each other when the first and second panels are in the deployed condition to place the conduit of the first panel in operable communication with the conduit of the second panel, and the first and second parts of the connector disengage from each other when the first and second panels are in the stowed condition to disconnect the conduit of the first panel from communication with the conduit of the second panel.

In another embodiment, a moveable wall for use in a structure has a power or communications supply. The moveable wall includes a first panel coupled to the structure for movement with respect to the structure between a stowed position and a deployed position. The first panel has a first electrical connection and a second electrical connection. The first electrical connection of the first panel is configured to receive a signal from the power or communications supply and to direct said signal to the second electrical connection. A second panel is coupled to the structure for movement with respect to the structure between a stowed position and a deployed position. The second panel has a third electrical connection and a fourth electrical connection. The third electrical connection is configured to electrically connect to the second electrical connection to receive said signal from the second electrical connection and to direct said signal to the fourth electrical connection. One of the second electrical connection and the third electrical connection has a degree of freedom to move relative to the respective panel.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
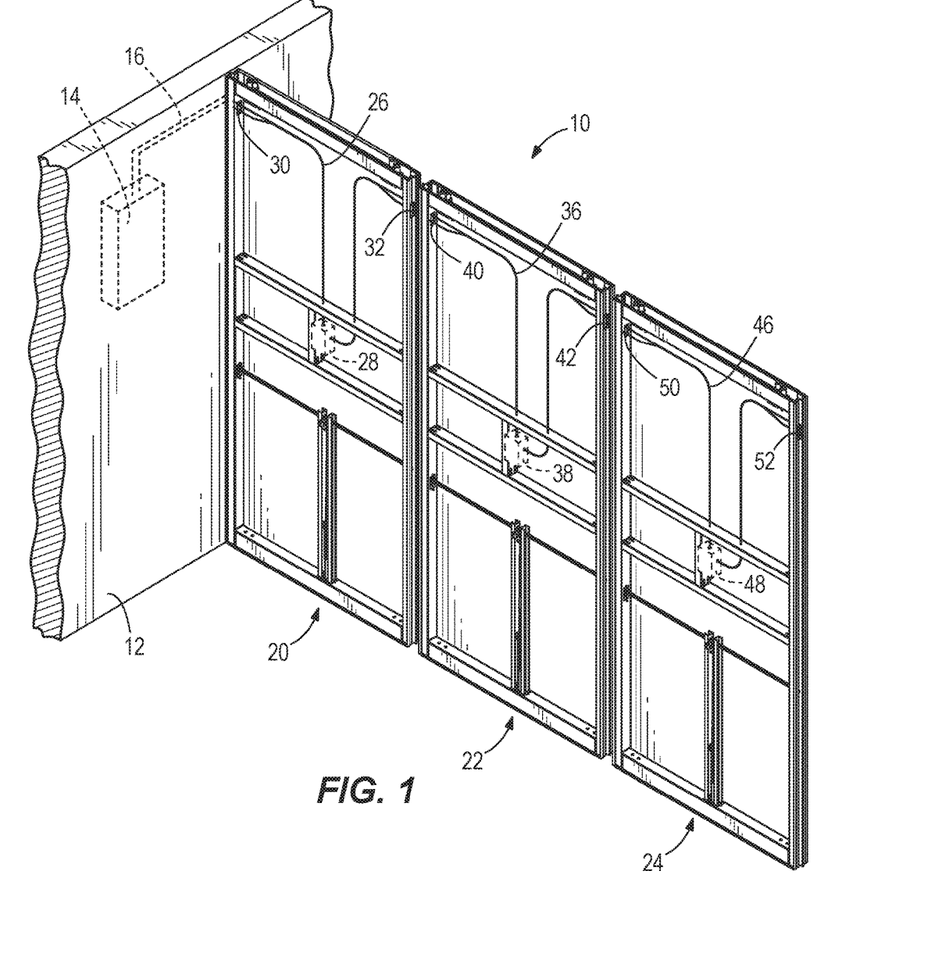
FIG. 1 is a perspective view of a wall panel assembly having a plurality of connectors.

FIG. 1 illustrates a moveable wall assembly 10 coupled to a building wall 12. The illustrated building wall 12 includes a power or communication supply 14 which is electrically connected to a building electrical connector 16. The power or communication supply 14 can supply any suitable electrical communication such as electrical current, and/or one or more audio visual signals to the building electrical connector 16.

The illustrated moveable wall panel assembly 10 includes a first panel 20, a second panel 22, and a third panel 24. In some embodiments, the first panel 20 the second panel 22 and the third panel 24 are identical, whereas in other embodiments, one or more of the first panel 20 the second panel 22 and the third panel 24 is different than the remaining panels 20, 22 and 24. The panels 20, 22 and 24 are all moveable with respect to the building wall 12 between a stowed position and a deployed position. FIG. 1 illustrates the deployed position in which the panels 20, 22 and 24 are positioned with short ends in abutment. The panels 20, 22 and 24 can be positioned with long faces in abutment when the panels 20, 22 and 24 are stowed. In some stowed positioned, the panels 20, 22 and 24 are positioned substantially parallel to the building wall 12, whereas in other stowed positioned, the panels 20, 22 and 24 are positioned substantially perpendicular to the building wall 12. In some embodiments, the moveable panels 20, 22 and 24 are supported from above by a track or other suitable support structure. In some embodiments, the moveable panels 20, 22 and 24 are supported from below by a channel or other suitable support structure.

The panels 20, 22 and 24 are rectangular prisms each of which includes two large faces extending perpendicular to the building wall 12 in FIG. 1, two long faces that extend generally perpendicular to the building wall 12 and form the top and bottom of the panels 20, 22 and 24, and two tall faces that extend substantially parallel to the building wall 12 and form the short sides of the panels 20, 22 and 24. More than three panels can be utilized, but three panels 20, 22 and 24 are shown by way of example only.

The first panel 20 includes wires 26 having a first end and a second end and extending between the two tall faces of the first panel 20. While not specifically illustrated, the wires 26 can be positioned in a conduit. The wires 26 are in electrical communication with the power or communication supply 14 via the building electrical connector 16. An electrical outlet 28 is shown in phantom between the first end and the second end of the wires 26. The electrical outlet is shown by way of example, but can be replaced with one or more connections for a computer, an audio/visual connection, USB connection or other suitable communication connection.

The first panel 20 includes a first connector 30 positioned adjacent the first end of the wires 26 and a second connector 32 positioned adjacent the second end of the wires 26. The first connector 30 is connected to the building electrical connector 16 when the first panel 20 is deployed and is disconnected from the building electrical connector 16 when the first panel 20 is stowed.

The second panel 22 includes wires 36 having a first end and a second end and extending between the two tall faces of the second panel 22. While not specifically illustrated, the wires 36 can be positioned in a conduit. An electrical outlet 38 is shown in phantom between the first end and the second end of the wires 36. The electrical outlet is shown by way of example, but can be replaced with one or more connections for a computer, an audio/visual connection, USB connection or other suitable communication connection.

The second panel 22 includes a first connector 40 positioned adjacent the first end of the wires 36 and a second connector 42 positioned adjacent the second end of the wires 36. The wires 36 are in electrical communication with the first connector 40 and the second connector 42. The first connector 40 is connected to the second connector 32 when the second panel 22 is deployed and is disconnected from the second connector 32 when the second panel 20 is stowed.

The third panel 24 includes wires 46 having a first end and a second end and extending between the two tall faces of the third panel 24. While not specifically illustrated, the wires 46 can be positioned in a conduit. An electrical outlet 48 is shown in phantom between the first end and the second end of the wires 46. The electrical outlet is shown by way of example, but can be replaced with one or more connections for a computer, an audio/visual connection, USB connection, switchable glass or other suitable communication connection.

The third panel 24 includes a first connector 50 positioned adjacent the first end of the wires 46 and a second connector 52 positioned adjacent the second end of the wires 46. The wires 46 are in electrical communication with the first connector 50 and the second connector 52. The first connector 50 is connected to the second connector 42 when the third panel 24 is deployed and is disconnected from the second connector 42 when the third panel 24 is stowed.

FIGS. 2-5 show the second connector 32 of the first panel 20 and the first connector 40 of the second panel 22 in greater detail. The illustrated second connectors 32, 42 and 52 are substantially identical and the discussion of second connector 32 equally applies to the second connectors 42 and 52. The illustrated first connectors 30, 40, 50 are substantially identical and the discussion of first connector 40 equally applies to the first connectors 30 and 50.

The illustrated second connector 32 is an articulating and sliding magnetic switch that is mounted to one of the tall faces of the first panel 20. The illustrated tall face of the first panel 20 includes an elongate protrusion that extends outward from the first panel 20 and an elongate recess that extends inward toward the first panel 20. The illustrated second connector 32 is positioned substantially within the elongate channel.

Figure 3:
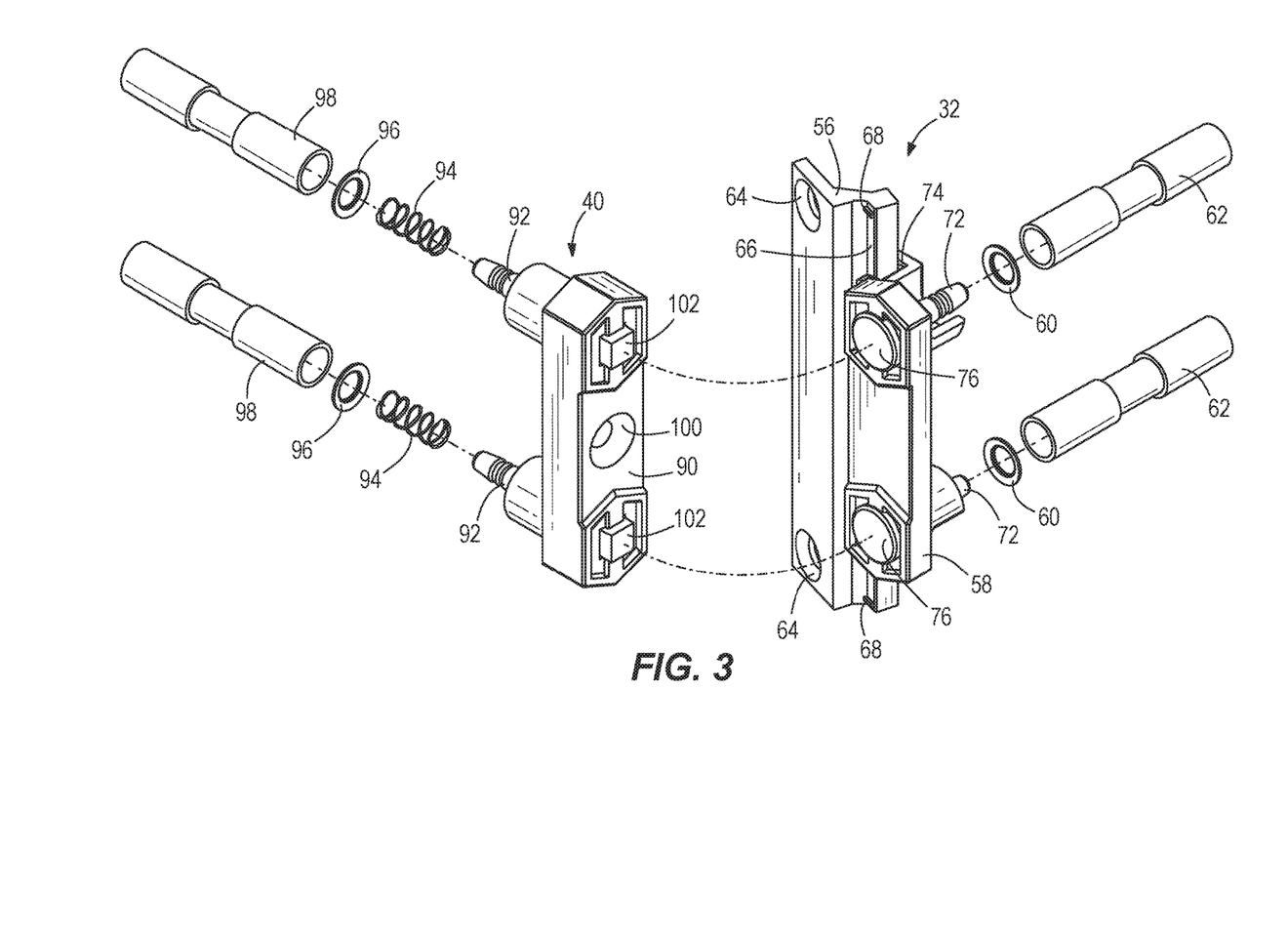
FIG. 3 is an exploded view of the two connectors of FIG. 2.

As shown most clearly in FIG. 3, the illustrated second connector 32 includes a first piece 56, a second piece 58, first and second push on fasteners 60, and first and second snap plug terminals 62.

Figure 2:
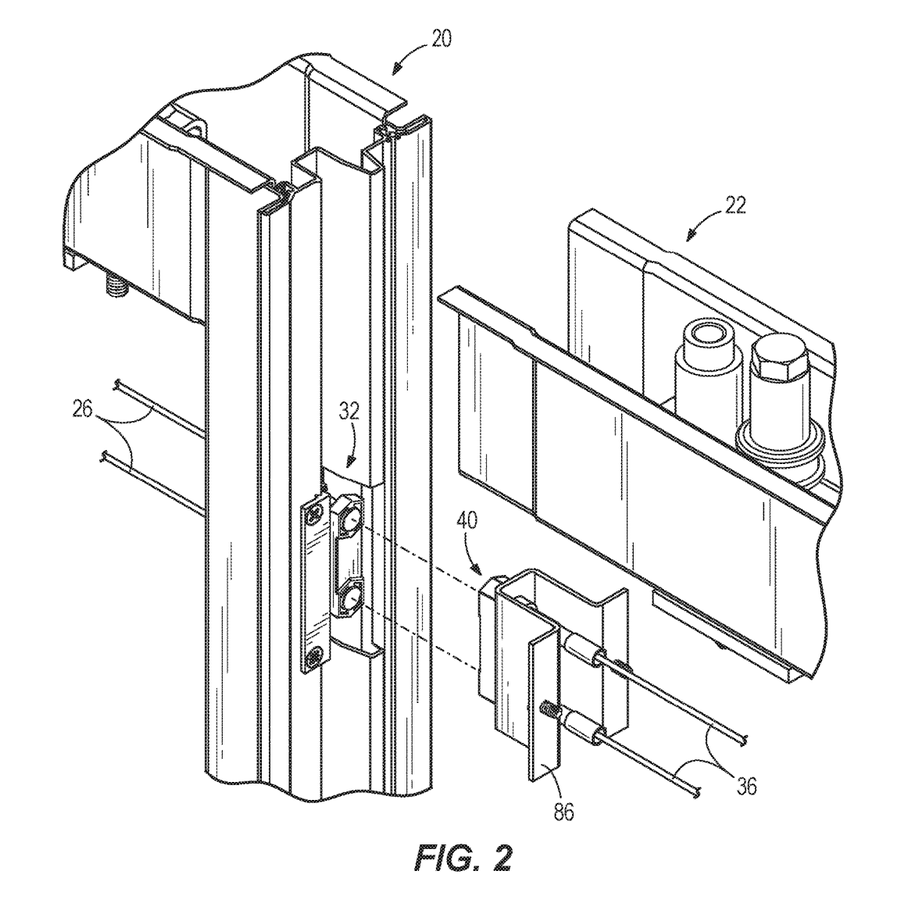
FIG. 2 is a close up view of two of the connectors.

The illustrated first piece 56 includes a pair of apertures 64 for receiving respective fasteners, such as the screws illustrated in FIG. 2, to couple the first piece 56 to the first panel 20. The first piece 56 also includes an elongate slide 66 having protrusions 68 at ends of the elongate slide 66.

The illustrated second piece 58 includes first and second pole connectors 72, and an elongate channel 74. The first and second pole connectors 72 each include an elongate portion that is sized to be received into the respective snap plug terminal 62, a substantially planar face 76 that extends away from the first panel 20 and shielding (part of which is removed in FIG. 3). The first and second pole connectors 72 are in electrical communication with the power or communication supply 14 via the building electrical connector 16, the wires 26 and the snap plug terminals 62 when the first panel 20 is in the deployed position. In some embodiments, more than two pole connectors 72 are utilized. For example, three or four pole connectors can be utilized in some configurations.

Figure 4:
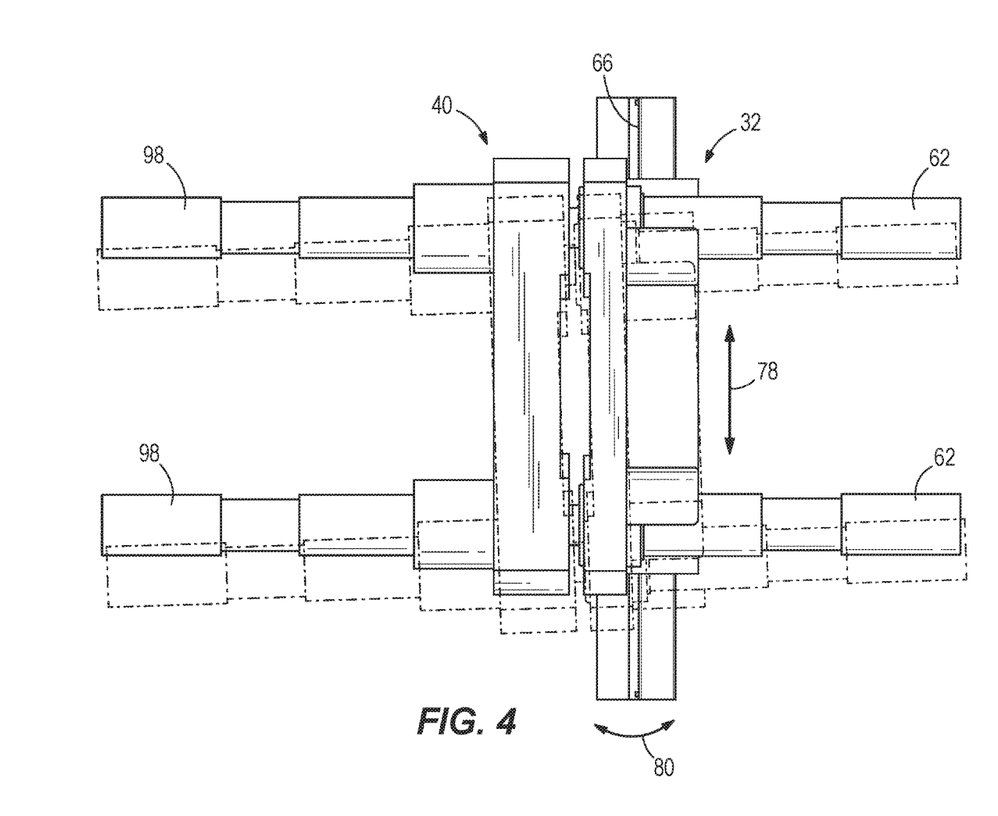
FIG. 4 is a side view of the connectors of FIGS. 2 and 3.
Figure 5:
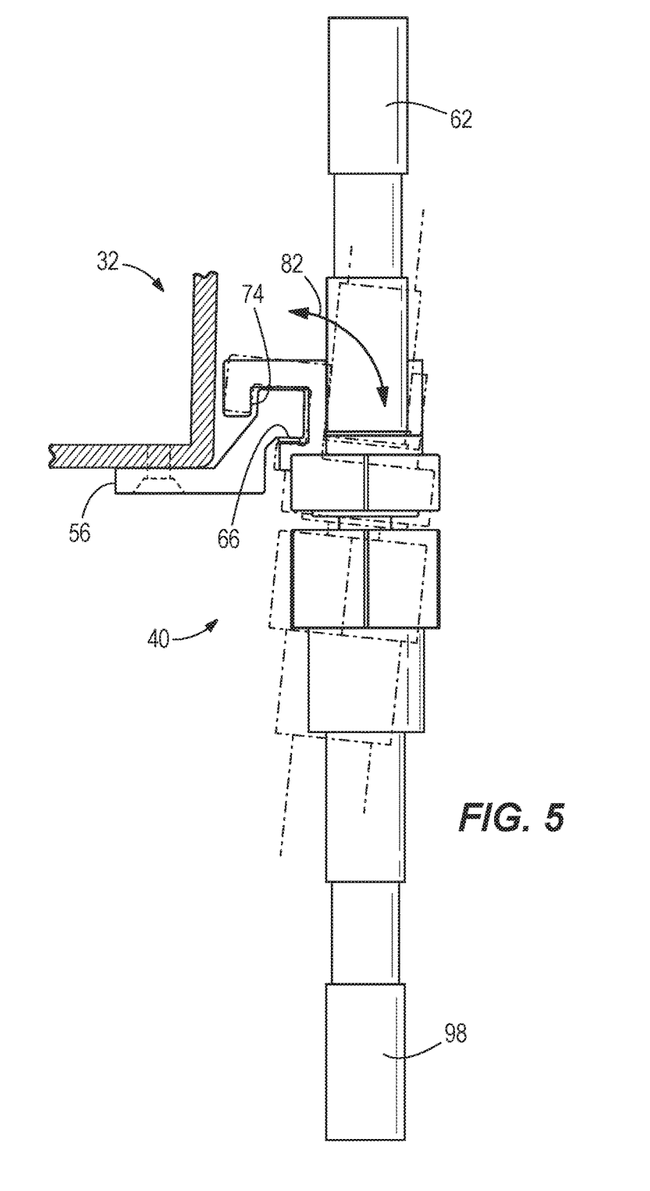
FIG. 5 is a top view of the connectors of FIGS. 2-4.

The elongate channel 74 is sized to receive the elongate slide 66 to permit the second piece 58 to move with respect to the first piece 56. Specifically, the first piece 56 is moveable with respect to the second piece 58 in a linear direction 78 along a vertical axis as shown in FIG. 4. The protrusions 68 at the ends of the elongate slide 66 retain the second piece 58 on the first piece 56. The elongate channel 74 is sized to be larger than the elongate slide 66 to permit the second piece 58 to rotate with respect to the first piece 56. The second piece 58 can rotate with respect to the first piece 56 about a horizontal axis in a pitch direction 80, and can rotate with respect to the first piece 56 about a vertical axis in a yaw direction 82, see FIGS. 4 and 5.

In the illustrated embodiment, the second piece 58 of the second connector 32 is permitted to move with respect to the first panel 20 and the first piece 56 of the second connector 32 about three separate degrees of freedom: in the linear direction 78, in the pitch direction 80 and in the yaw direction 82.

The illustrated first connector 40 is a stationary spring loaded steel connector that is mounted to one of the tall faces of the second panel 22 with a bracket 86 (see FIG. 2). The tall face of the second panel 22 is omitted for clarity but can include an elongate protrusion that extends outward from the second panel 22 and an elongate recess that extends inward toward the second panel 22. The elongate protrusion of the second panel 22 can engage the elongate recess of the first panel 20 and the elongate recess of the second panel 22 can receive the elongate protrusion of the first panel 20. The first connector 40 can be positioned substantially within the elongate protrusion of the second panel 22.

As shown most clearly in FIG. 3, the illustrated first connector 40 includes a main portion 90, first and second pole connectors 92, first and second springs 94, first and second snap on fasteners 96, first and second snap plug terminals 98, and an aperture 100 for fastening the first connector 40 to the bracket 86.

The illustrated first and second pole connectors 92 each include an elongate portion that is sized to be received into the respective snap plug terminal 98, a substantially planar face 102 that extends away from the second panel 22 and shielding. The first and second pole snap plug terminals 98 are in electrical communication with the snap plug terminals 62 when the faces 76 of the second connector 32 engage the faces 102 of the first connector 40 (i.e., when the first and second panels 20, 22 are in the deployed position). In some embodiments, more than two pole connectors 92 can be utilized. For example, three or four pole connectors can be used in some configurations.

The springs 94 permit limited movement of the respective first and second pole connectors 92 in an axial direction (substantially perpendicular to the faces 102). When the faces 76 of the second connector 32 are close to the respective face 102 of the first connector 40, the faces 76 and 102 are drawn together by magnetic force. When the faces 76 and 102 are in abutment, the connectors 32 and 40 permit electricity, an audio/visual signal, and/or other communication to move between the connectors 32 and 40.

In some embodiments, a confirmation signal is sent from all of the connectors 30, 32, 40, 42, 50 and 52 back to the power source 14. If the confirmation signal is not received by one or more of the connectors 30, 32, 40, 42, 50 and 52, the power source 14, the power source 14 will not send the primary signal to the respective one or more connectors 30, 32, 40, 42, 50 and 52. In some configurations, the confirmation is a smaller voltage than the primary signal. The confirmation signal can inhibit any potential electrical shock occurrences in situations when the connectors 30, 32, 40, 42, 50 and 52 do not completely connect.

Several factors can cause one or more of the panels 20, 22, 24 etc. to move out of alignment with adjacent panels and/or with the building wall. For example, misalignments can occur due to variation in panel production such that panel parts are not installed in perfect alignment in all of the panels. Additionally, when panels are installed in a building, the panels need to be adjusted plumb to the building wall(s) which can move one or more of the panels out of alignment with adjacent panels. In some circumstances one or more of the vertical members of the panel(s) can bow or twist which could inhibit a connection between adjacent panels. Roof structures can sometimes deflect from different loads over time (i.e., snow, wind, excessive and/or varying weight in one or more floors above the panels, etc.). Such deflection of roof structures can inhibit one or more of the panels from connecting to an adjacent panel. Some panel configurations are set up to be positioned in a specific manner. If the panels are set up in a different manner, the panels may not connect to adjacent panels properly. If air pressure in adjacent rooms separated by the panels differs greatly, one or more of the panels can be moved out of alignment with adjacent panels, especially when some of the panels seal against a floor surface to a different degree than other panels. If a person or an object bumps into one or more of the panels, that force can move one or more of the panels out of alignment with adjacent panels, thus inhibiting a connection between said panels. Some panel types may hang out of balance on occasion, thereby inhibiting connection between adjacent panels.

The illustrated second connectors 32, 42 and 52 are all capable of articulating about three separate degrees of freedom to accommodate one or more misalignments between adjacent panels and thereby maintain an electrical and/or communication connection between adjacent panels through adjacent connectors. Specifically if the first and second panels 20 and 22 are out of alignment, the second adjustable connector 32 can adjust about one or more of the three degrees of freedom to connect to the first stationary connector 40. Additionally, if the second and third panels 22 and 24 are out of alignment, the second adjustable connector 42 can adjust about one or more of the degrees of freedom to connect to the first stationary connector 50. As noted above with respect to FIGS. 4 and 5, the three degrees of freedom include movement of the second connector(s) in the linear direction 78, in the pitch direction 80 and in the yaw direction 82. Movement in only one or two degrees of freedom is possible because the second connectors only move in the necessary direction(s) to connect to the respective first connectors. Therefore, the second connectors 32, 42, 52 adjust about one, two or three degrees of freedom to accommodate any misalignment of adjacent panels and to thereby connect to the adjacent first connector 40, 50.

Various features and advantages of the invention are set forth in the following claims.

What is claimed is:

1. A moveable wall coupled to a structure and operable to receive power from a power source, the moveable wall comprising:
   a first panel coupled to the structure for movement with respect to the structure, the first panel having a first electrical connection, the first panel configured to receive power from the power source and to direct said power to the first electrical connection; and
   a second panel coupled to the structure for movement with respect to the structure, the second panel having a second electrical connection, the second electrical connection configured to electrically connect to the first electrical connection to receive said power from the first electrical connection,
   wherein one of the first electrical connection and the second electrical connection has a degree of freedom to move relative to the respective panel, and
   wherein the other of the first electrical connection and the second electrical connection is permitted to move linearly in the horizontal direction with respect to the respective panel but is prevented from rotating with respect to the respective panel.

2. The moveable wall of claim 1, wherein the degree of freedom includes one of linear movement along a height of the respective panel, rotation about a substantially horizontal axis, or rotation about a substantially vertical axis.

3. The moveable wall of claim 1, wherein the degree of freedom includes two of the following: linear movement along a height of the respective panel, rotation about a substantially horizontal axis, or rotation about a substantially vertical axis.

4. The moveable wall of claim 1, wherein the degree of freedom includes linear movement along a height of the respective panel, rotation about a substantially horizontal axis, and rotation about a substantially vertical axis.

5. An operable wall for use in a building having a building power or communications supply, the operable wall comprising:
   a first panel movable between a deployed condition and a stowed condition, the first panel including an electrical or communications conduit having first and second opposite ends, the first end of the conduit being in operable communication with the building power or communications supply;
   a second panel movable between a deployed condition and a stowed condition, the second panel including an electrical or communications conduit having first and second opposite ends; and
   a connector comprising a first part having a first face and operably communicating with the second end of the conduit of the first panel and a second part having a second face and operably communicating with the first end of the conduit of the second panel, the second part having a degree of freedom of movement with respect to the second panel, wherein the first and second faces of the connector are drawn into abutment with each other by a magnetic force when the first and second panels are in the deployed condition to place the conduit of the first panel in operable communication with the conduit of the second panel, and wherein the first and second faces of the connector disengage from each other when the first and second panels are in the stowed condition to disconnect the conduit of the first panel from communication with the conduit of the second panel.

6. The operable wall of claim 5, wherein the second panel further comprises an outlet in operable communication with the conduit of the second panel, the outlet facilitating plugging a device into the conduit of the second panel.

7. The moveable wall of claim 5, wherein the degree of freedom includes one of linear movement along a height of the respective panel, rotation about a substantially horizontal axis, or rotation about a substantially vertical axis.

8. The moveable wall of claim 5, wherein the degree of freedom includes two of the following: linear movement along a height of the respective panel, rotation about a substantially horizontal axis, or rotation about a substantially vertical axis.

9. The moveable wall of claim 5, wherein the degree of freedom includes linear movement along a height of the respective panel, rotation about a substantially horizontal axis, and rotation about a substantially vertical axis.

10. The moveable wall of claim 5, further comprising a third panel moveable between a stowed position and a deployed position, the third panel including an electrical or communications conduit having first and second opposite ends.

11. The moveable wall of claim 10, wherein the connector is a first connector and further comprising a second connector including a first part operably communicating with the second end of the conduit of the second panel and a second part operably communicating with the first end of the conduit of the third panel, the second connector having a degree of freedom of movement with respect to the third panel.

12. The moveable wall of claim 11, wherein the first and second parts of the second connector engage each other when the second and third panels are in the deployed condition to place the conduit of the second panel in operable communication with the conduit of the third panel, and wherein the first and second parts of the connector disengage from each other when the second and third panels are in the stowed condition to disconnect the conduit of the second panel from communication with the conduit of the third panel.

13. A moveable wall for use in a structure having a power or communications supply configured to send a primary signal, the moveable wall comprising:

a first panel coupled to the structure for movement with respect to the structure between a stowed position and a deployed position, the first panel having a first electrical connection and a second electrical connection, the first electrical connection of the first panel configured to receive said primary signal from the power or communications supply and to direct said primary signal to the second electrical connection; and a second panel coupled to the structure for movement with respect to the structure between a stowed position and a deployed position, the second panel having a third electrical connection and a fourth electrical connection, the third electrical connection configured to electrically connect to the second electrical connection to receive said primary signal from the second electrical connection and to direct said primary signal to the fourth electrical connection, wherein one of the second electrical connection and the third electrical connection has a degree of freedom to move relative to the respective panel, wherein the first electrical connection is configured to send a first confirmation signal to the power or communications supply, wherein the second electrical connection is configured to send a second confirmation signal to the power or communications supply, wherein when the third electrical connection is electrically connected to the second electrical connection, the third electrical connection is configured to send a third confirmation signal to the power or communication supply, and only upon receiving the first, second and third confirmation signals, the power or communications supply is configured to send the primary signal to the first electrical connection, to the second electrical connection, and to the third electrical connection.

14. The moveable wall of claim 13, wherein the degree of freedom includes at least one of the following: linear movement along a height of the second panel, rotation about a substantially horizontal axis, or rotation about a substantially vertical axis.

15. The moveable wall of claim 13, wherein the degree of freedom includes at least two of the following: linear movement along a height of the second panel, rotation about a substantially horizontal axis, or rotation about a substantially vertical axis.

16. The moveable wall of claim 13, wherein the degree of freedom includes linear movement along a height of the second panel, rotation about a substantially horizontal axis, and rotation about a substantially vertical axis.

17. The moveable wall of claim 13, further comprising a third panel coupled to the structure for movement between a stowed position and a deployed position, the third panel having a fifth electrical connection and a sixth electrical connection, the fifth electrical connection configured to receive power from the fourth electrical connection and to direct said power to the sixth electrical connection, wherein one of the fifth and sixth electrical connections has a degree of freedom to move relative to the third panel.

18. The moveable wall of claim 17, wherein the degrees of freedom each include at least one of the following: linear movement along a height of the second panel, rotation about a substantially horizontal axis, or rotation about a substantially vertical axis.

19. The moveable wall of claim 17, wherein the degrees of freedom each include at least two of the following: linear movement along a height of the second panel, rotation about a substantially horizontal axis, or rotation about a substantially vertical axis.

20. The moveable wall of claim 17, wherein the degrees of freedom each include linear movement along a height of the second panel, rotation about a substantially horizontal axis, and rotation about a substantially vertical axis.

* * * * *